(12) United States Patent
Mays, Jr.

(10) Patent No.: US 6,413,450 B1
(45) Date of Patent: Jul. 2, 2002

(54) THERMAL SHAPING OF OPTICAL FIBERS

(75) Inventor: Robert Mays, Jr., Austin, TX (US)

(73) Assignee: Megladon Manufacturing Group, Austin, TX (US)

(*) Notice: Subject to any disclaimer, the term of this patent is extended or adjusted under 35 U.S.C. 154(b) by 0 days.

(21) Appl. No.: 09/692,991

(22) Filed: Oct. 20, 2000

(51) Int. Cl.[7] .......................... B29D 11/00; B23K 26/00
(52) U.S. Cl. .................. 264/1.27; 219/121.72; 264/1.26; 264/1.37; 264/2.7; 264/482
(58) Field of Search .............. 264/1.26, 1.27, 264/1.37, 400, 482, 2.7; 219/121.72, 121.95

(56) References Cited

U.S. PATENT DOCUMENTS

| | | |
|---|---|---|
| 4,710,605 A | 12/1987 | Presby |
| 4,932,989 A | 6/1990 | Presby |
| 5,011,254 A | 4/1991 | Edwards et al. |
| 5,256,851 A | 10/1993 | Presby |
| 5,446,816 A | 8/1995 | Shiraishi et al. |
| 5,677,778 A | 10/1997 | Kanterakis et al. |
| 5,699,464 A | 12/1997 | Marcuse et al. |
| 5,772,720 A * | 6/1998 | Taira-Griffin et al. ...... 264/1.26 |
| 5,809,198 A | 9/1998 | Weber et al. |
| 5,935,288 A * | 8/1999 | Digiovanni et al. |
| 6,246,026 B1 * | 6/2001 | Vergeest ................. 219/121.72 |

OTHER PUBLICATIONS

WO 99/60192, Brown, Nov. 25, 1999.
WO 00/05026, Stiftung, Feb. 3, 2000.
WO 00/32327, Meyer et al., Jun. 8, 2000.
WO 00/02700, Hoetzel, Jan. 20, 2000.
WO 00/28359, Feth et al., May 18, 2000.
WO 99/59766, Brown, Nov. 25, 1999.

* cited by examiner

Primary Examiner—Mathieu D. Vargot
(74) Attorney, Agent, or Firm—Kenneth C. Brooks

(57) ABSTRACT

A method for shaping an optical fiber with various geometries while minimizing unwanted artifacts in the core of the optical fiber. The method facilitates control of sag in the region of the core that is exposed to a beam of optical energy. The sag is reduced, if not eliminated, by maintaining the cross-sectional area of the core that is exposed to the beam at thermal equilibrium.

20 Claims, 5 Drawing Sheets

THERMAL SHAPING OF OPTICAL FIBERS

BACKGROUND OF THE INVENTION

The present invention relates to optical fibers. More particularly, the present invention is directed toward segmentation of optical fibers suitable for use with data communication.

To minimize insertion loss, the loss of optical energy when coupling data links in fiber-optic communication systems, it is important to correctly match the aperture through which optical energy is transmitted with the aperture through which optical energy is detected. As a result the areas of the apertures must be correctly sized and aligned.

The ideal interconnection of one fiber to another would have two fibers that are optically and physically identical and held by a connector that aligns the fibers so that the interconnection does not exhibit any influence on light propagation therethrough. Formation of the ideal interconnect is impractical for several reasons. These include variations in fiber properties, tolerances in the connector, as well as and in cost and ease of use.

Commercially available interconnection devices have typical insertion losses from between 0.2 dB to 4 dB. This range of insertion loss results from several factors that maybe divided into those related to fibers and those related to interconnection devices. Fibers intrinsically contribute loss to an interconnection and any fiber has variations that are produced during manufacture. These variations exist not only among different lots of fibers, but also within a length of a single fiber, as well. The main variations in these cases are in the core and cladding diameters and fiber numerical aperture (NA). The core ellipticity, cladding ellipticity, and core-to-cladding eccentricity exacerbate the problems associated with variations in the core and cladding diameters. Losses caused by diameter variations, NA variations, eccentricity, and ellipticity are intrinsic to the fiber and the total loss contributed by these intrinsic factors can range from less than 0.2 dB to over 2 dB, depending on how well two fibers match.

Connector-related losses may also arise even when there are no intrinsic variations in the fibers. These types of losses arise when two fibers are not aligned on their center axes and lateral or axial displacement can be, and usually is, the greatest cause of loss in the connection. For example, a 0.5 dB loss that is due to a displacement, equal to 10% of the core diameter, will require tolerances to be maintained on each connector (fiber) that is within 2.5 $\mu$m. Tolerances of this magnitude are difficult to achieve. Add to this, the losses that are also induced due to angular misalignment, and the total tolerances that must be maintained in the termination process, proper fiber and/or connector end preparation becomes problematic.

The considerations discussed above with respect to fiber-to-fiber interconnections apply equaling to fiber-source and fiber-detector interconnections, as well. The result is that the requirements that should be achieved to provide efficient optical coupling necessitate end-finishing or termination processes that strives to provide lossless propagation of optical energy. To that end, it is desired to provide the end of a fiber that functions as either a transmission or reception aperture with a smooth finish free of such defects that may change the geometrical propagation patterns of optical energy passing therethrough. These defects include hackles, burrs, and fractures.

Preparation of conventional glass optical fibers employs score-and-break techniques or mechanical polishing techniques. The score-and-break technique provides an optical fiber with an arc that is scored. Tension is applied to that optical fiber so that the score propagates across the width of the optical fiber, segmenting the same. This technique is capable of producing excellent end finishes. Repeatability, however, is difficult, lowering yields and increasing the cost of the finished optical fibers. In addition, a great amount of skill is required to properly control both the depth of the scoring and the amount of tension during breaking. The aforementioned control may be frustrated by intrinsic fiber variations. Finally, the difficulty in controlling both the depth of scoring and breaking tension increases as the length of the optical fiber becomes shorter.

Polishing, compared to scribing-and-breaking, has the advantage of consistent results, but is a much more costly technique. Polishing is typically performed after a connector, or ferrule, has been attached to the optical fiber. Polishing a bare optical fiber is impractical. Usually, a polishing fixture is provided that controls the polishing to a fixed dimension, e.g., usually within 0.3 $\mu$m.

Polymer-based optical fibers may be segmented with a sharp, and preferably hot, blade. As with the polishing technique mentioned above with respect to glass optical fibers, segmenting is performed on polymer-based optical fibers after a connector has been attached. Polymer-based optical fibers may also be polished, but with great difficulty.

In addition to providing a smooth end finish, the preparation procedure should provide the optical fiber with a cleaved end, i.e., the end of the optical fiber should be planar and lying in a plane with the longitudinal axis of the optical fiber extending orthogonally thereto. Otherwise, an angle may exist between the axes of juxtaposed fibers and fibers-devices, referred to as tilting. Tilting can cause additional, and sometimes quite severe, losses in addition to those mentioned previously. While tilting loss can be controlled to some degree by proper end preparation and positioning of adjacent fiber ends, it should not be completely ignored. Often alignment mechanisms are employed to reduce the effects of tilting. Such alignment mechanisms includes lenses that may be effectively coupled and aligned, (with minimum loss, to the end of the optical fiber).

Referring to FIG. 1, a fiber-to-fiber arrangement 10 employing lensed optical fibers 12 and 14 is shown. The lenses are shown as 12a and 14a, at the ends of the optical fibers 20 and 22, respectively. The lenses 12a and 14a are typically spherical and refract optical energy, shown as 12b and 14b, propagating therethrough to facilitate control of the path of light therebetween. In this manner, the lateral and axial alignment between the optical fibers 12 and 14 may be relaxed. However, the fibers 12 and 14 should be accurately placed and aligned behind the lenses in order to actually see any real or significant benefits to the overall loss considerations (e.g., low losses). Moreover, such conditions are most often achieved without the aid of non-integral support elements such as lenses, when the appropriately prepared fiber ends are perpendicular to the fiber axis. One manner in which to form lenses 12a and 14a is discussed below with respect to a source-fiber arrangement.

Referring to FIG. 2, shown is a source-fiber arrangement in which a lens is formed on one end of an optical fiber. The fiber-source arrangement 16 includes an optical fiber 18 composed of a core 18a and a cladding 18b. A lens 20 is formed at an end of a fiber core. Were the optical fiber 18 formed from silica glass, the lens 20 would be formed in the following manner: First, while a portion of the silica glass optical fiber 18 is heated by heating means such as a burner, a tensile force is applied to the fiber in the longitudinal direction thereof, whereby the heated portion extends. When the outer diameter of the heated portion has decreased to a predetermined diameter, the optical fiber 18 is cut at the diameter-reduced portion, and then the cut end is again heated for fusion. In the heating step, the extreme end 22 of the optical fiber 18, including the core 18a in the center thereof, becomes spherical in shape due to surface tension, and this spherical end functions as a lens. Thus, the lensed optical fiber 18 has a taper portion 24 extending from the extreme end 22 to an outer peripheral edge which is not affected by heat and having a certain inclination determined by the heating and drawing conditions. The lensed optical fiber 18 produced in this manner is optically connected to a semiconductor laser 26, and a laser beam 28 is emitted from a light-emitting surface 30 of the semiconductor laser 26. In this case, the laser beam 28 radiates in conical form. The laser beam 28 is incident on the spherical surface 22 at the extremity of the core 18a is propagated through the core 18a, as indicated by the arrows in FIG. 2, and is used for optical communications. A drawback with the prior art attempt of lens formation is the number of steps required to properly shape the optical fiber, which increase the time and cost of process.

What is needed, therefore, is a technique to reduces the time required to shape optical fibers.

SUMMARY OF THE INVENTION

Provided is a method that features shaping of optical fibers with various geometries, while minimizing unwanted artifacts in the optical path of the fiber core. To that end, the method facilitates control of sag in the region of an optical fiber core that is exposed to a beam of optical energy. In one example, the beam is described as consisting essentially of infra-red wavelengths, the sag is reduced, if not eliminated, by stiffening the optical fiber core to prevent the same from bending under force of gravity. In this manner, the cross-sectional area of the optical fiber that is exposed to the beam may be maintained at thermal equilibrium. In an alternative embodiment, thermal equilibrium of the optical fiber is facilitated by reflecting a portion of the optical beam to impinge upon the optical fiber core from a direction that is opposite to the direction of beam travel. To that end, the region of the fiber core to be segmented by the optical energy is spaced apart from the deflective surface. These and other embodiments are described below.

DETAILED DESCRIPTION OF THE INVENTION

Figure 1:
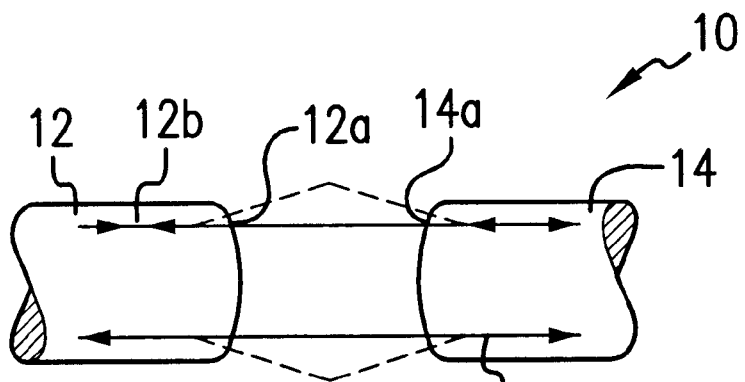
FIG. 1 is a perspective view of showing coupling of optical energy between two spaced-apart optical fibers, according to the prior art.
Figure 2:
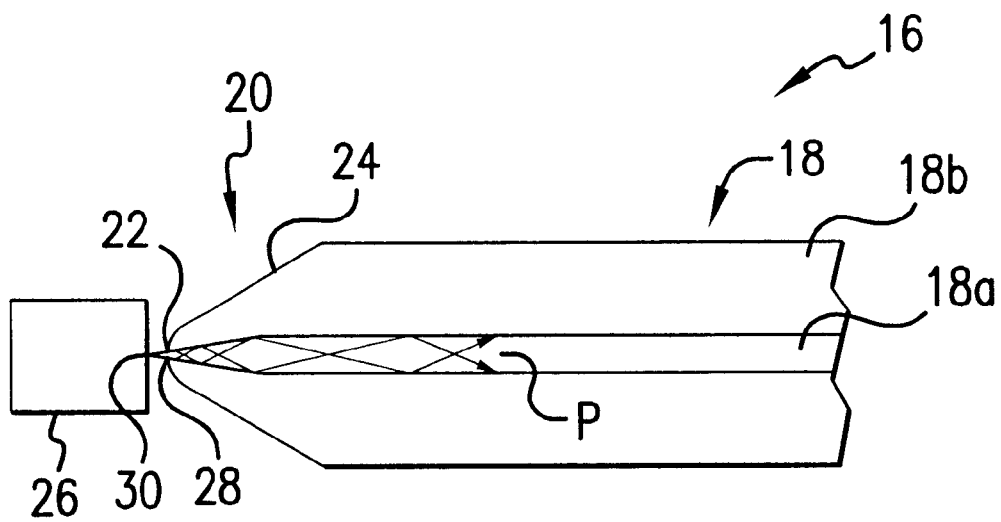
FIG. 2 is a simplified plan view of a source to fiber coupling arrangement of optical energy in accordance with the prior art.
Figure 3:
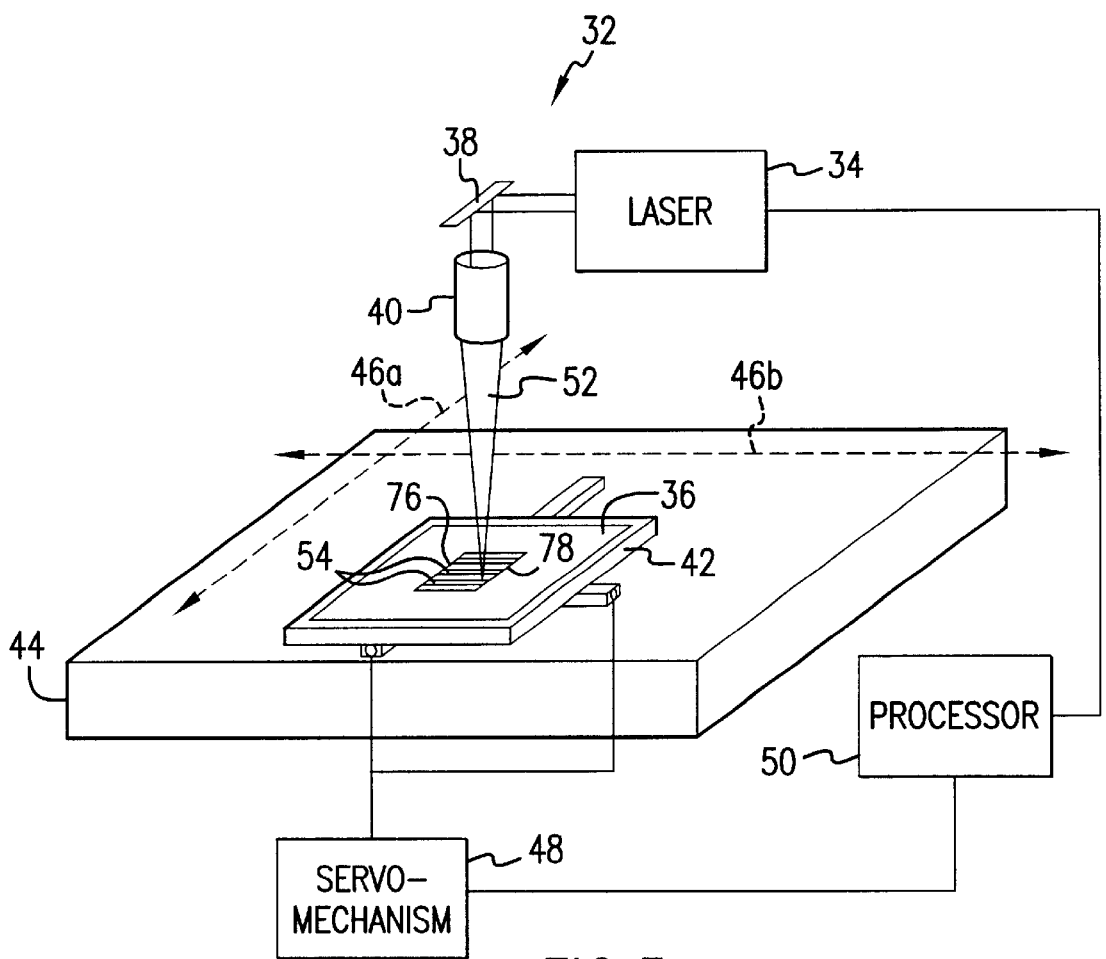
FIG. 3 is a simplified perspective view showing a laser shaping system in accordance with the present invention.

Referring to FIG. 3, an exemplary system 32 that is suitable for shaping optical fibers in accordance with the present invention. The system 32 includes a beam source 34 in optical communication with a platen 36 through a pick-off mirror 38 and beam shaping optics 40. The platen 36 is attached to a stage 42 that is moveably attached to a frame 44. Specifically, the stage 42 is moveably attached to the frame 44 to reciprocate along at least one axis 46a. The stage 42 may also be attached to move along an axis orthogonal to axis 46a, shown as 46b. To that end, a servo-mechanism 48, in data communication with a processor 50, is coupled to the stage 42 to facilitate movement along both axes 46a and 46b under control of the processor 24. In this manner, positional control along the axes 46a and 46b was achieved to within 4 μm, with the laser 34 being able to impinge a beam 52 upon any area of the platen 36, desired. In the present example, one or more optical fibers 53 are attached to the platen 36 using any technique known in the art. The velocity of the stage 42 along either of the axes 46a and 46b may be from stationary to 1 inch/sec or more. The beam 52 impinges upon the optical fibers 53 to segment and/or shape the same.

Although any type of laser may be employed, the present exemplary system employed laser manufactured by KERN Electronics and Lasers, Inc. Model # KER6X6-10 to provide basic 10 Watt $CO_2$ beam. The beam 52, therefore, comprises of infrared (IR) wavelengths of optical energy of sufficient power to segment the optical fibers 53. The beam profile was adjusted dependent upon the segmentation technique employed, discussed more fully below. With this configuration, the dwell time, period of time in which a single fiber element is exposed to the beam 52, can then be varied from less than a microsecond to more than a millisecond. In addition, manual, single pulse or continuous wave operation of the laser source 34 was also been made available.

Figure 4:
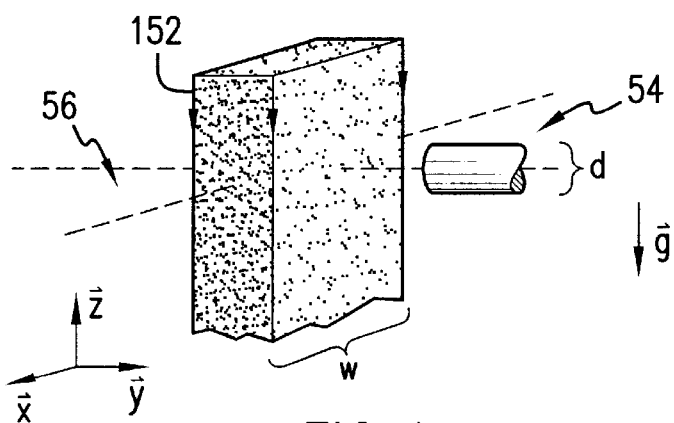
FIG. 4 is a perspective view of an optical fiber being exposed to thermal energy of a laser beam shown above in FIG. 3, in accordance with the present invention.

Referring to FIG. 4, the type of cut and/or surface finish achieved on each of the optical fibers 53 is a function, inter alia, the spatial proximity between the beam 52 and the optical fiber 53, as well as the beam energy to which the optical fiber 53 is exposed. Specifically, it is shown that the plane in which the segmentation of the fiber 54 occurs, the cutting plane 56, extends in the $\vec{x}$ and $\vec{y}$ directions. The beam 152 propagates in the $\vec{z}$ direction to impinge upon the cutting plane 56, while relative movement between the fiber 53 and the beam 152 parallel to the $\vec{x}$ direction occurs. In this arrangement, the energy distribution in the beam 152 is substantially uniform throughout the cross-section thereof. With this beam profile 152, a two-step technique is employed to segment and polish the end of the core of the optical fiber 53. To that end, the beam 152 functions as a straight-edged thermal blade.

Figure 5:
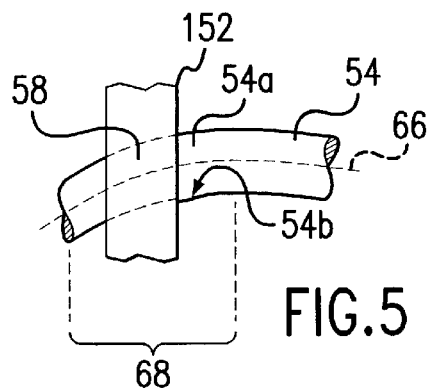
FIG. 5 is a detailed cross-sectional view of an optical fiber shown bending under force of gravity.

In the first step, the beam 152 is provided with a sufficient amount of energy to propagate through the fiber 53 to segment both the cladding 57 and the core 54. The energy of the beam 152 to achieve segmentation was found to be in the range of 20% to 30% of total power available from laser 34, dependent upon the type of material that the beam 152 has to segment. The width "w" of the beam 152 is approximately 1.25–1.4 times greater than the core diameter "d". When exposed to the thermal energy of the beam 152, the core of the optical fiber 54 underwent a plurality of phase-changes in which the solid core becomes a viscous liquid and a gas. Specifically, as shown in FIG. 5, the portion 58 of the core 54 exposed to the beam 152 undergoes two phase-changes with some of the material associated therewith vaporizing and the remaining material becoming molten. The regions 54a and 54b of the core 54 that are in close proximity with the beam 152 also become molten.

Figure 6:
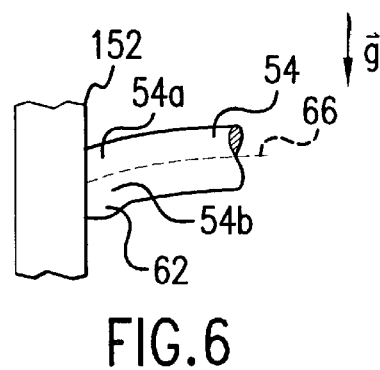
FIG. 6 is a cross-sectional view of the optical fiber shown above in FIG. 5 with sag.

Referring to FIGS. 3, 5 and 6, while in the molten state the core material moves under force of gravity, $\vec{g}$, and accumulates proximate to region 54b, forming a protrusion 62. The formation of the protrusion 62 is typically referred to as sag. The amount of sag may be controlled, in part, by selecting an appropriate dwell time. For a fixed amount of energy in the beam 152 the dwell time is set by the velocity of the stage 42. The stage 42 velocity is between 0.2 and 0.5 inch/second, dependent upon the cross-sectional area of the fiber 54 being segmented. It was found, however, that regulation of the dwell time, alone, was insufficient to substantially reduce, if not eliminate the sag. Rather, the sag that occurs in the molten state is minimized and/or eliminated by stiffening the optical fiber so that the same does not bend under force of gravity, $\vec{g}$.

Figure 7:
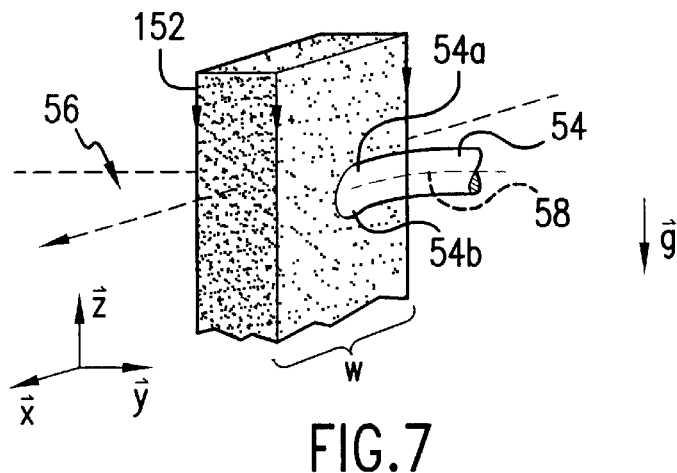
FIG. 7 is a detailed perspective view of the fiber shown above in FIG. 5.
Figure 8:
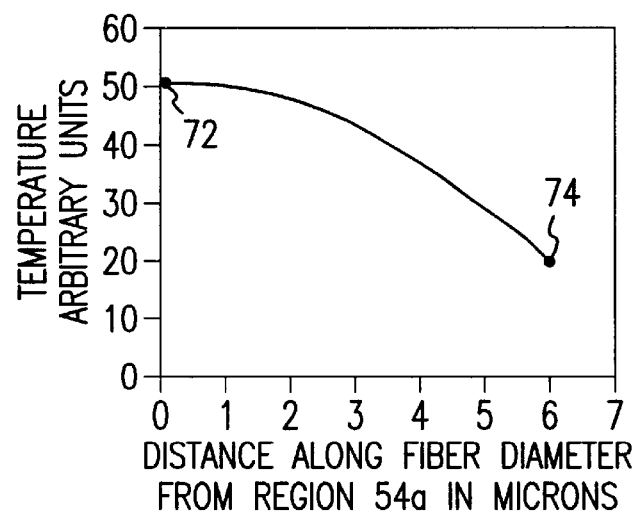
FIG. 8 is a graph showing the difference in the temperature over the diameter of the optical fiber shown above in FIGS. 5, 6 and 7.

As shown in FIGS. 5 and 7, it was found that the sag was the result of the core 54 bending upon force of gravity, $\vec{g}$, during segmentation. Specifically, without stiffening the core 54, the longitudinal axis 66 associated with a subportion 68 of the core 54 forms an oblique angle with respect to gravity, $\vec{g}$. As a result, when the beam 152 segments the core 54 a temperature gradient develops between opposing regions 54a and 54b of the core 54. The region 54a heats faster and therefore, reaches a higher temperature, than region 54b. This results in uneven heat propagation through the core 54. As a result, for a brief period of time, the end of the core 54 will concurrently have two phase-states present. When the beam 152 initially impinges upon the core 54, the region 54a becomes molten while the region 54b maintains a solid state. As heating continues, the end of the core 54 proceeds to a homogenous phase state of a viscous liquid. However, due to a temperature gradient present in the core 54, a much greater amount molten material is present in region 54a than is present in region 54b. An exemplary thermal profile of the core 54 is shown by curve 70 in FIG. 8. As shown by the curve 70, the temperatures of region 54a, shown as point 72, may be 2.5 times greater than the temperature at region 54b, shown as point 74. This temperature gradient produces sag.

Referring to FIGS. 3 and 7, to reduce the sag produced during segmentation, it is ensured that the longitudinal axis 66 associated with the portion 68 exposed to the beam 152 extends transversely to gravity, $\vec{g}$. To that end, opposing regions 76 and 78 of the optical fiber 53 are securely affixed to a rigid surface, such as the platen 36, using any suitable means known in the art. Region 58 is located between regions 76 and 78. This has been found to substantially reduce, if not eliminate sag.

Subsequent to segmenting the fiber 53, the energy in the beam 152 is reduced to be 30% or less of the energy employed to segment the fiber 53, while maintaining the same beam width. The optical fiber 53 is then exposed to the thermal energy of the beam 152 so as to minimize the dwell time. This may be achieved by first having the optical fiber 53 thermally insulated from the beam 152. Then movement between the optical fiber 54 and the beam 152 in a direction parallel to the $\vec{x}$ axis is undertaken. In this manner, the dwell time is on the order of a few microseconds. During the dwell time, the end 59 of the core 54 rapidly undergoes two phase-changes before any sag occurs: solid to a viscous liquid and viscous liquid to a solid. This allows the end 59 of the core 54 to reflow, thereby providing a smooth surface, while avoiding the effects of gravity when the core 54 is placed in the molten state for too long a period of time. This results in a fire polish of the end 59 with surface anomalies of 50 nm or less, while minimizing curvature. The depth of refractive action within the fiber itself due to the curvature itself is minimal at less than 1 $\mu$m, which is considered as a perpendicular cut and polish.

It should be understood, that the polishing step may be achieved by movement between the fiber and the beam 152 along a direction a direction parallel to the $\vec{y}$ axis. In this manner, the beam 152 is initially collinear with the fiber core, but spaced-apart a sufficient distance to be thermally insulated from the core 54. After, the beam 152 and the fiber 54 are positioned collinearly, rapid movement along the $\vec{y}$ axis is facilitated to expose the core 54 to the thermal energy of the beam 152, while minimizing dwell time for the reasons discussed above.

Figure 9:
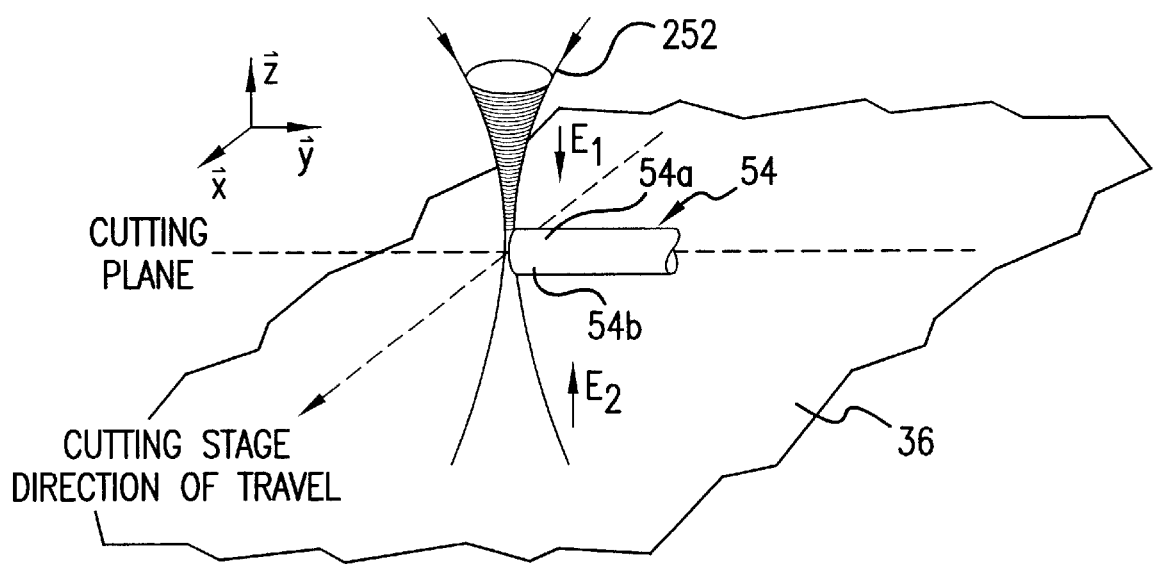
FIG. 9 is a perspective view of the optical fiber being segmented with laser beam in accordance with an alternate embodiment of the present invention.

Referring to FIG. 9 in another embodiment, a single step may be employed to segment the core 54 and polish the resulting end thereof. To that end, the beam 252 includes a narrow waist 252a that is disposed proximate to the core 54. In this fashion, the beam 252 functions as a thermal scalpel, with the waist 252a having a greater energy per unit area than the remaining regions of the beam 252, shown as 252b. The thermal difference between narrow waist 252a and the remaining portion of beam may be so that the thermal density in narrow waist 252b is as much as one order of magnitude higher than the thermal density in the remaining regions of beam 252. This beam profile presents, to the optical core 54, a thermal wavefront having a high temperature gradient, which that exacerbates control of sag. This thermal wavefront results in uneven heat propagation through the core 54. The uneven heat propagation produces a temperature gradient in the core 54, whereby one region of the core 54a is heated to a greater temperature than an opposing region 54b. As a result, for a brief period of time, the end of the core 54 will concurrently have two phase-states present. Specifically, when the beam 252 initially impinges upon the core 54, the region 54a becomes molten while the region 54b maintains a solid state. As heating continues, the end of the core 54 proceeds to a homogenous phase state of a viscous liquid. However, due to the temperature gradient present in the core 54, a much greater amount of molten material is present in region 54a than is present in region 54b. This temperature gradient present in the optical fiber 54 frustrates control of the shaping of the end due to the presence of sag.

Figure 10:
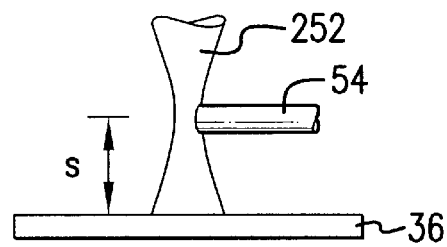
FIG. 10 is a side-sectional view of the optical fiber and laser beam shown above in FIG. 9 demonstrating a beam focus proximate to the optical fiber rests and spaced apart from a platen.

Referring to FIGS. 9 and 10, to reduce, if not eliminate, the temperature gradient between regions 54a and 54b, the platen 36 is selected to be thermally reflective. In this manner, thermal energy $E_1$ and $E_2$ propagates along a direction parallel to the $\vec{z}$ axis to impinge upon the core 54 from opposite directions. In one direction, thermal energy $E_1$ from the beam 252 impinges upon the region 54a. A portion of the thermal energy $E_1$ is reflected from the platen 36 in the form of reflected thermal energy $E_2$ to impinge upon region 54b. To that end, the spacing, "s" between the waist 252a and the platen 36 is chosen to ensure that the flux of the reflected energy $E_2$ impinging upon region 54b results in a temperature difference between regions 54a and 54b, $\Delta t$, that is approximately zero. The exact spacing, s, is dependent upon the reflecting surface, the diameter of the optical fiber 54 and the temperature gradient presented by the beam 252. As a result, the waist 252a may be positioned above, below of at the cutting plane.

Figure 11:
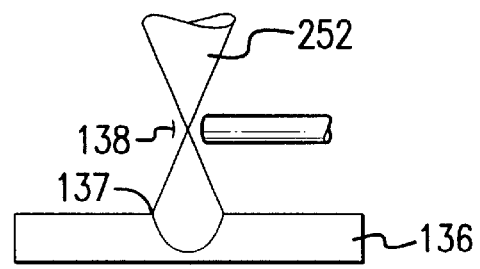
FIG. 11 is a cross-sectional view of the optical fiber and laser beam shown above in FIG. 10 with a platen having a curved surface, in accordance with an alternate embodiment of the present invention.

Referring to FIG. 11, in an alternative embodiment, a parabolic reflective surface 137 may be employed that may be formed integrally with the platen 136. Alternatively, an additional body (not shown) may be disposed between the platen 136 and the optical fiber 53 that is thermally reflective and defines a parabolic surface. The parabolic reflective surface 137 defines a focus 138 and the optical fiber 53 would be positioned proximate to the focus. In this manner greater control of the flux of thermal energy $E_2$ that impinges upon the optical fiber 53 may be obtained.

Referring to 12, the core 354 that is to be segmented is typically mounted in a connector 302 that includes a ferrule 304 and has had the cladding (not shown) removed. The ferrule 304 may be made from any suitable material, such as ceramic, polymer, metal and the like. The optical fiber 354 is typically fixed to the ferrule 304 using any suitable adhesive, such as epoxy. The section 306 of the optical fiber 354 that is to be segmented extends from the ferrule 304, terminating in an end 308. The end 308 is mounted to a first mechanical support 310, and the connector 302 is mounted to a second mechanical support 312. The first 310 and second 312 mechanical supports rest against the platen 336, with the section being spaced-apart therefrom. Extending beneath the section 306 is a thermally reflective body 314 that includes a recess defining a curved surface, the nadir of which is shown by the dotted line 316.

Figure 12:
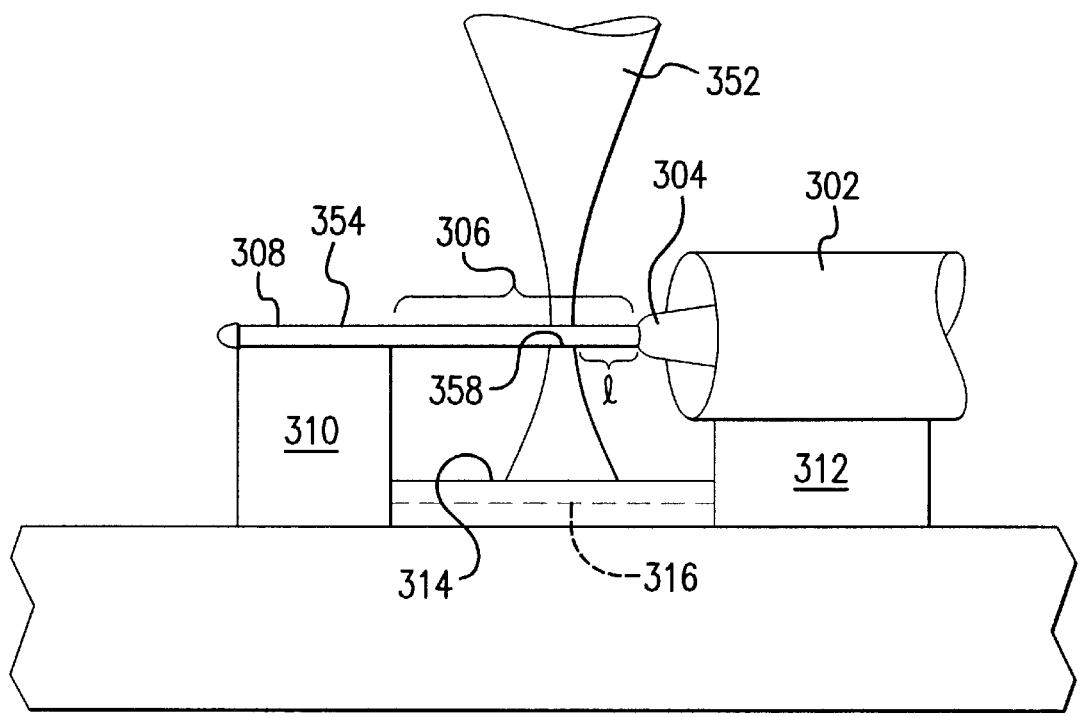
FIG. 12 is a detailed view showing the mounting arrangement of an optical fiber disposed in a connector to be segmented by the system shown above in FIG. 3.

In this arrangement, typically a beam having a narrow waist 352a is employed, as discussed above, with the waist of the beam 352 being focused proximate to the optical fiber 354, shown in FIG. 12. Considerations when segmenting the optical fiber 354 concern providing a sufficient length, l, between the region 358 to be vaporized by the beam 352 and the ferrule 304. Specifically, the length, l, should be sufficient to ensure dissipation of thermal energy propagating through the optical fiber 354 does not damage the ferrule 304. In addition, the length, l, should be sufficiently short to facilitate efficient coupled of the connector/fiber combination with another connector/fiber combination while providing a fiber-to-fiber interface. As a result, it was found that the length, l, should be no greater than 4 microns and typically no less than one micron. However, the minimum length of, l, is dependent upon the energy of the beam 352.

With the present invention segmentation of an optical fiber having a glass core with a nominal core diameter of eight microns resulted in the formation of a spherical lens at one end thereof, with the following specifications:

| Measurement Parameter | Measured Value | |
|---|---|---|
| Radius of Curvature | 16.46 | mm |
| Fiber Height (Spherical Fit) | −26.1 | nm |
| Fiber Height (Planar Fit) | 91.2 | nm |
| Apex Offset | 9.62 | $\mu$m |
| Bearing | 225.400 | degrees |
| Angle | 0.033 | degrees |
| Tilt Offset | | degrees |
| Actual Angle | | degrees |
| Key Error | | degrees |
| Fiber Roughness (Rq) | 6 | nm |
| Fiber Roughness (Ra) | 4 | nm |
| Ferrule Roughness (Rq) | 3 | nm |
| Ferrule Roughness | 2 | nm |
| Diameter | 129.2 | $\mu$m |

It is seen that shaping of optical fibers in accordance with the present invention, facilitates concurrently segmenting, polishing and lensing of the optical core with the optical fiber being pre-assembled in a connector. Thus, the optical fibers may be quickly and easily shaped for fiber-to-fiber interconnections while providing precise control over the profile of the end of the core and maximizing throughput.

Moreover, there are other arrangements that may be employed that would fall within the scope of the present invention. As stated above, virtually any type of thermal beam source may be employed, e.g., an Ultra Violet laser such as an Excimer may be employed. Therefore, the scope of the invention should not be based upon the foregoing description. Rather, the scope of the invention should be determined based upon the claims recited herein, including the full scope of equivalents thereof.

What is claimed is:

1. A method for shaping an optical fiber having an optical core, said method comprising:
   exposing a region of said optical fiber to a source of thermal energy by impinging a beam of infrared energy upon said optical fiber from a first direction and reflecting said infrared energy to impinge upon said optical fiber from a second direction, with said second direction being opposite to said first direction to minimize thermal differences across a cross-section of said optical fiber;
   creating relative movement between said optical fiber and said source of thermal energy along a direction transverse to a longitudinal axis of said optical fiber; and
   concurrently segmenting and polishing said optical fiber to form a finished end proximate to said region.

2. The method as recited in claim 1 wherein concurrently segmenting and polishing said optical fiber further includes concurrently segmenting, polishing and lensing said optical fiber.

3. The method as recited in claim 1 further including stiffening a portion of said optical fiber, with said portion including said region.

4. The method as recited in claim 3 wherein stiffening said portion includes securely affixing segments of said optical fiber located proximate to opposed ends of said portion to a rigid surface, with said region being spaced-apart from said rigid surface.

5. The method as recited in claim 1 wherein exposing said optical fiber to a source of thermal energy further includes forming said beam of infrared energy with said infrared energy associated therewith being coherent, with said beam including a cross-sectional area with a varying distribution of said infrared energy, with a density of the infrared energy in said beam located proximate to said region being greater than a density of the infrared energy in the remaining regions of said beam.

6. The method as recited in claim 5 wherein reflecting said infrared energy further includes reflecting said infrared energy from a parabolic surface defining a focus proximate to said region.

7. The method as recited in claim 1 wherein concurrently segmenting and polishing said optical fiber further includes passing said infrared energy through a cross-sectional area of said optical fiber.

8. The method as recited in claim 1 wherein exposing said optical fiber to a source of thermal energy further includes forming said beam of infrared energy with said infrared energy associated therewith being coherent, with said beam including a cross-sectional area with a homogenous distribution of said infrared energy.

9. The method as recited in claim 1 wherein exposing said optical fiber to a source of thermal energy further includes forming said beam of infrared energy with said infrared energy associated therewith being coherent, with said beam including a cross-sectional area with a varying distribution of said infrared energy, with a density of the infrared energy in said beam located proximate to said region being at least one order of magnitude greater than a density of the infrared energy in the remaining regions of said beam.

10. A method for shaping an optical fiber having an optical core, said method comprising:
    exposing a region of said optical core to a source of thermal energy that comprises of an infrared beam;
    segmenting said optical core by creating relative movement between said optical core and said beam along a direction transverse to a longitudinal axis of said optical core, with said beam passing through a cross-sectional area of said optical core; and
    stiffening a portion of said optical core by securely affixing opposed ends of said optical fiber to a rigid surface to prevent bending of said optical core under force of gravity so as to reduce sag, with said region being disposed between said opposed ends and spaced-apart from said rigid surface.

11. The method as recited in claim 10 wherein exposing a region of said optical core further includes impinging thermal energy upon said optical core from a first direction and reflecting said thermal energy to impinge upon said optical core from a second direction, with said second direction being opposite to said first direction.

12. The method as recited in claim 10 wherein exposing a region of said optical core further includes impinging thermal energy upon said optical core from a first direction and reflecting said thermal energy from a parabolic surface to impinge upon said optical core from a second direction, opposite to said first direction, with said parabolic surface defining a focus proximate to said region.

13. The method as recited in claim 10 wherein exposing a region of said optical core to a source of thermal energy further includes providing said infrared beam with a cross-sectional area having a substantially homogenous distribution of thermal energy.

14. The method as recited in claim 10 wherein exposing a region of said optical core to a source of thermal energy further includes providing said beam with a cross-sectional area having a varying distribution of thermal energy, with a density of the thermal energy in said beam located proximate to said region being at least one order of magnitude greater than a density of the thermal energy in the remaining regions of said beam.

15. A method for shaping an optical fiber having an optical core, said method comprising:
    impinging an optical beam upon a first region of said optical core from a first direction and reflecting a portion of said optical beam to impinge upon a second region, disposed opposite to said first region, from a second direction, opposite to said first direction to attenuate temperature differences between said first and second regions; and
    creating relative movement between said optical core and said beam to expose an entire cross-section of said optical core to said optical beam.

16. The method as recited in claim 15 further including stiffening a portion of said optical core by securely affixing said optical fiber to a rigid surface, with said optical core being spaced-apart from said rigid surface.

17. The method as recited in claim 16 wherein impinging an optical beam further includes providing said beam with a cross-sectional area having a substantially homogenous distribution of optical energy.

18. The method as recited in claim 16 wherein impinging an optical beam further includes providing said beam with a cross-sectional area having a varying distribution of optical energy, with a density of optical energy in said optical beam located proximate to said region being at least one order of magnitude greater than a density of the optical energy in the remaining regions of said optical beam.

19. The method as recited in claim 18 wherein impinging an optical beam further includes reflecting said optical beam from a parabolic surface to impinge upon said second region, with said parabolic surface defining a focus proximate to said second region.

20. The method as recited in claim 18 wherein said optical beam includes infrared wavelengths.

* * * * *

UNITED STATES PATENT AND TRADEMARK OFFICE
CERTIFICATE OF CORRECTION

PATENT NO. : 6,413,450 B1
DATED : July 2, 2002
INVENTOR(S) : Mays, Jr.

It is certified that error appears in the above-identified patent and that said Letters Patent is hereby corrected as shown below:

Column 9,
Line 3, following "being", insert -- at least one order of magnitude --.

Column 10,
Line 39, following "said", insert -- optical --.
Line 41, following "of", insert -- the --.

Signed and Sealed this

Third Day of December, 2002

JAMES E. ROGAN
*Director of the United States Patent and Trademark Office*